Feb. 28, 1967   R. A. GREEN ET AL   3,306,470
FOLDING BOOM FOR MOBILE CRANES
Filed Jan. 25, 1965   4 Sheets-Sheet 1

ROBERT A. GREEN
WESLEY DOBSON
INVENTORS.

BY Ernest Carl Edge

Feb. 28, 1967   R. A. GREEN ET AL   3,306,470
FOLDING BOOM FOR MOBILE CRANES
Filed Jan. 25, 1965   4 Sheets-Sheet 2

ROBERT A. GREEN
WESLEY DOBSON
INVENTORS.

BY Earnest Carl Edge

ROBERT A. GREEN
WESLEY DOBSON
INVENTORS.

BY Earnest Carl Edge

Feb. 28, 1967    R. A. GREEN ET AL    3,306,470
FOLDING BOOM FOR MOBILE CRANES
Filed Jan. 25, 1965    4 Sheets-Sheet 4

ROBERT A. GREEN
WESLEY DOBSON
*INVENTORS.*

BY *Ernest Carl Edge*

United States Patent Office 3,306,470
Patented Feb. 28, 1967

3,306,470
FOLDING BOOM FOR MOBILE CRANES
Robert A. Green, 698 Chapel Hill Blvd., Boynton Beach, Fla. 33435, and Wesley Dobson, 123 NW. 11th Ave., Delray Beach, Fla. 33444
Filed Jan. 25, 1965, Ser. No. 427,848
6 Claims. (Cl. 212—144)

This invention relates in general to cranes and in more particularity to a folding boom for mobile cranes.

It is a primary object of the invention to provide a foldable boom construction which may be quickly and easily reduced in length for convenience in transportation of the crane.

In the construction of buildings, especially buildings of large size, a crane with a relatively long boom section is required to adequately serve the builder's needs. To transport such cranes from one location to another it is now common practice to mount the cranes, including the lengthy booms, on motor trucks. This provides the mobility desired but, due to the long booms required to serve the building industry, the conventional boom extends out a substantial distance from the mobile carrier.

Local laws and regulations limit the length of vehicles transported along our streets and highways and since the building industry requires cranes with long booms the boom is usually too long to be allowed to travel the highways.

Even if the length of the boom is within the local length limit, travelling with the boom in the extended position also tends to make the transporting motor truck unstable and perhaps even dangerous, particularly over uneven roads or terrain.

Heretofore, to solve the problem the booms of the crane have been so fabricated that sections of the boom may be separated by the removal of bolts or pins located at each corner of each section. Once the fasteners have been disconnected the removed sections of boom are lifted onto a separate vehicle and transported separately from the crane to the job site. Once on the job site then the boom must be reassembled and rebolted before it is ready for use.

This dismantling and reassembling operation is time consuming and requires the use of several man hours of labor. It not only utilizes the man hours of the men performing the operation but oftentimes several other workers are temporarily idled while the dismantling and reassembling operation takes place. Thus transportation of a crane with a lengthy boom becomes a time-consuming and therefore an uneconomical operation.

It is an object of this invention, therefore, to provide a foldable boom structure for cranes which may be quickly and easily placed in position for transportation by the carrier vehicle itself and which may be quickly and easily reassembled for use on the job site with very little consumption of time and labor.

In the method of boom dismantling described above in which the sections of the boom are removed, another time consuming step in the operation is the removal of the pendant lines. With the sections of the boom taken out the pendant lines are left hanging loose, therefore they must also be disconnected, transported to the new locus of use and then reconnected when the boom is reassembled.

It is a further object of this invention to provide a foldable boom construction in which the pendant lines need not be removed but are so arranged that they will fold under with the boom and by the one simple step of removing a pin carried by each line are placed in readiness for operation of the crane once the boom is in extended operable position.

It is a further object of the invention to provide a unique structure for the prevention of the fouling of the hoisting cables and sheaves during the folding and unfolding operation by providing the sheaves with an equalizer bar arrangement.

It is a still further object of the invention to provide the end of the boom with a new and novel wheeled arrangement so that it may ride easily along the ground without damage thereto during the folding and unfolding operation.

Further objects and advantages of the present invention will become apparent from a consideration of the following description and drawings wherein.

Figure 1:
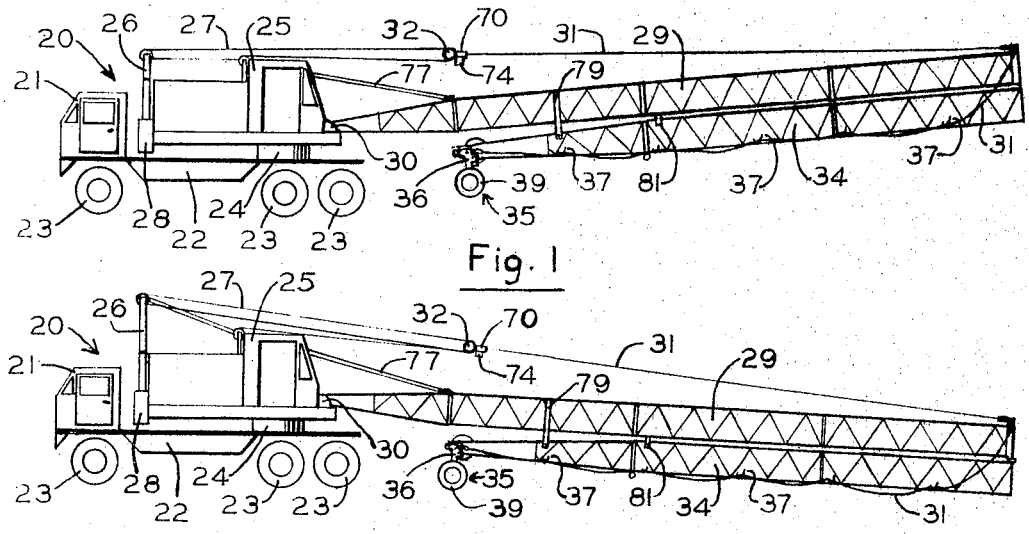
FIGURE 1 is an elevational view of a mobile crane according to our invention in which the boom is folded into position for transporting.

Referring now to FIGURE 1 of the drawings, the crane is mounted on the motorized carrier shown generally as 20. The carrier includes a driver's cab 21 containing a suitable prime mover mounted on frame 22. Wheels 23 provide the carrier with the means of mobility.

Also mounted on the frame 22 is turntable 24 upon which the crane cab 25 is mounted. The cab contains the necessary operating controls for the crane as well as the hoisting mechanism for the crane boom. Also mounted on the turntable 24 is telescopic gantry 26 used for support of the lines 27.

Figure 2:
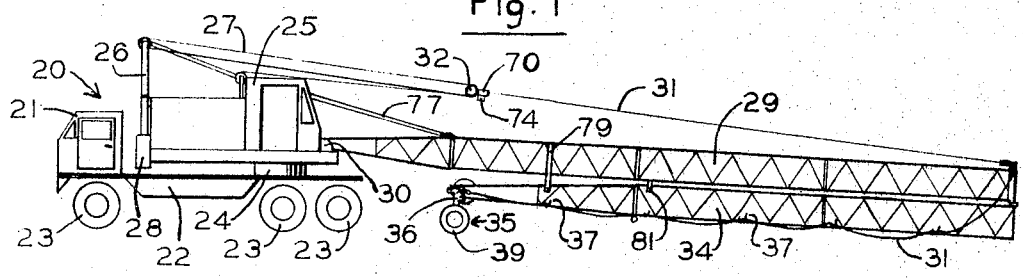
FIGURE 2 is an elevational view of the crane with the boom lowered in preparation for reassembly of the boom.

In FIGURE 1 the telescopic gantry 26 is shown in its lowered position while in FIGURE 2 it is shown in its raised position.

Suitable counterweights 28 are provided for proper balance of the crane structure.

Main boom 29, comprised a plurality of sections pinned together in conventional manner, is pivotally connected to the base of the turntable 24 at 30.

Main boom 29 is shown as being supported by pendant lines 31 connected to sheaves 32 which are connected by lines 27 to gantry 26.

Hingedly connected to main boom 29 is foldable boom 34. Attached to the boom point of foldable boom 34 is wheeled support 35 connected to boom 34 by convertible axle 36. The outer portions of pendant lines 31 are shown as supported by hooks 37 when the boom is folded.

Figure 5:
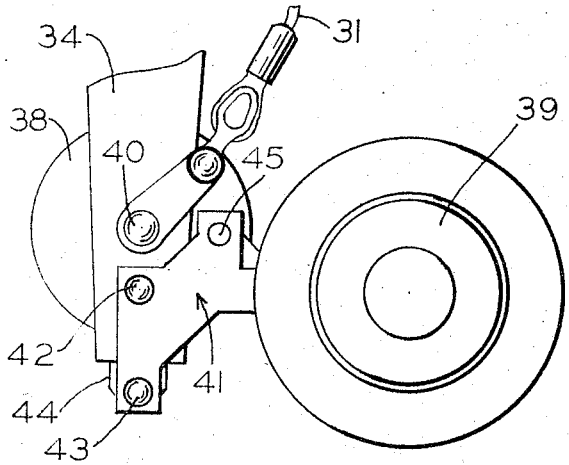
FIGURE 5 is a detailed elevational view of a portion of the boom and the wheel support in the position used to move the foldable portion from a horizontal transporting position shown in FIGURES 1 and 2 to a vertical position such as that shown in FIGURE 4.
Figure 6:
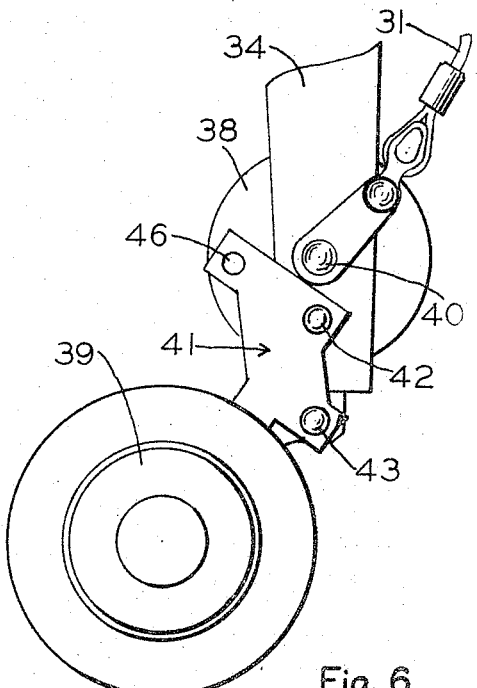
FIGURE 6 is a detailed elevational view of a portion of the boom and the support wheel with the wheel in position for moving the boom from the position shown in FIGURE 4 to the position shown in FIGURES 7 and 12.

FIGURES 5 and 6 show in detail the wheeled support used for protecting and supporting the boom point 34 while folding and unfolding the boom. FIGURE 5 illustrates the position of the wheeled carriage used to move the foldable boom from transit position of FIGURE 1 to the position shown in FIGURE 4.

In FIGURE 5, boom point 34 is shown as holding sheaves 38 over which the hoisting cable travels. Pendant line 31 is shown as being pivotally attached at 40 to boom point 34. Outwardly from connection 40 on boom point 34 carriage 41, to which a plurality of wheels 39 are attached, is shown as connected to boom 34 by pivot 42.

Still further outwardly from this pivot 42, carriage 41 is fastened by member 43 to the end 44 of boom point 34. Carriage 41 also contains hole 45, the use of which will be explained in detail later.

Figures 3, 4:
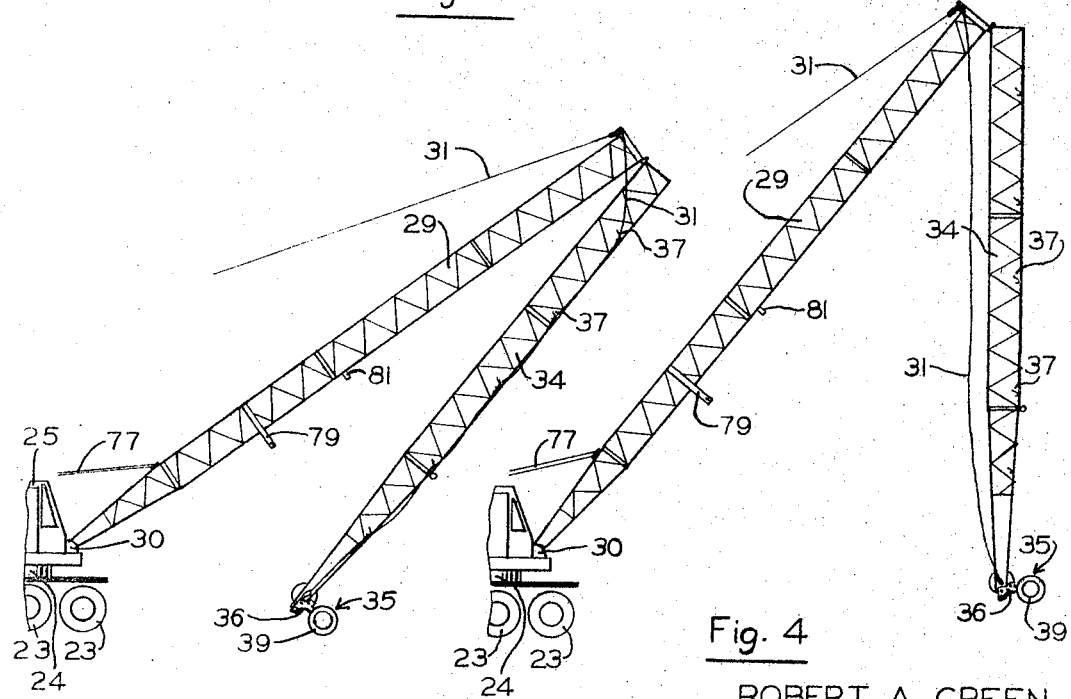
FIGURE 3 is an elevational view of the crane with the boom being raised so that the foldable portion will travel outwardly toward an operable position.
FIGURE 4 is an elevational view of the crane with the foldable portion in a vertical position prior to transfer of the support wheel to a second support position.

FIGURE 6 illustrates the position of the wheeled carriage when it is used to move the foldable boom from the position shown in FIGURE 4 to that shown in FIGURES 6 through 9.

In FIGURE 6 fastener 43 has been shown as removed from hole 46, the carriage 41 along with wheels 39 has been rotated clockwise until hole 45 is aligned with the hole in end 44 of boom 34. Fastener 43 is then inserted into hole 45 and the wheeled support is now in position for use again.

If it is desired to remove the entire wheeled support from the boom, fasteners 43 and pivot 42 are removed and the wheeled support is free of the boom.

Figure 8:
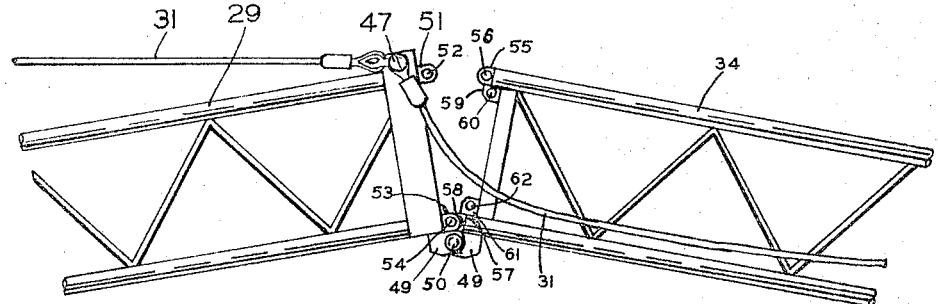
FIGURE 8 is an enlarged fragmentary elevational view of the hinged portion of the boom prior to reassembly to operable position.
Figures 10, 11, 12:
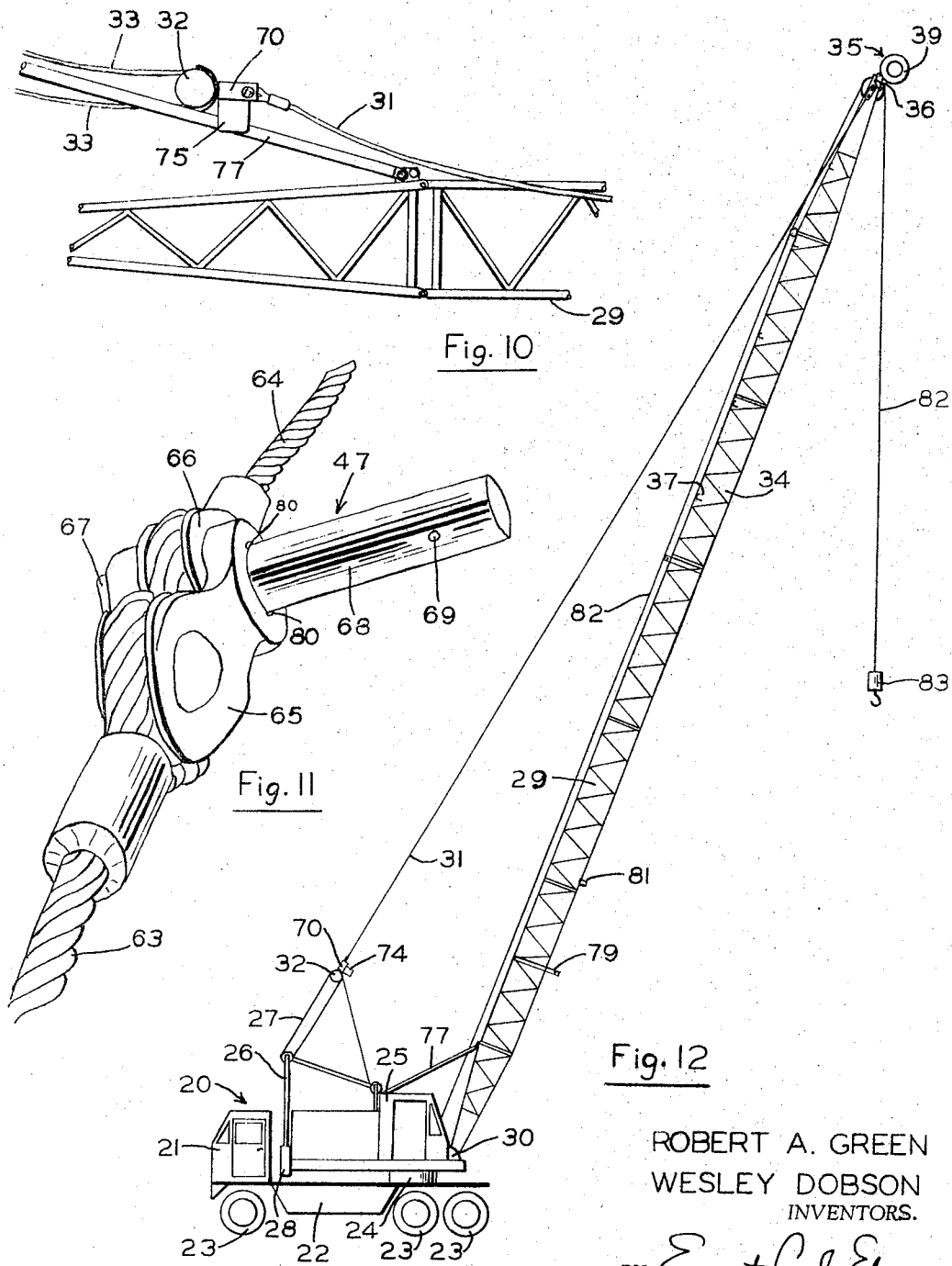
FIGURE 10 is a fragmentary elevational view showing the equalizer bar in its relaxed position prior to the shifting of the pivot point of the pendant lines before folding the boom.
FIGURE 11 is a perspective view of a section of the pendant line showing the connector for two sections of pendant lines along with the pin used to support the shortened boom after the outer section has been folded under.
FIGURE 12 is an elevational view of the crane in a reassembled operating position.

FIGURE 8 shows in detail the connection of the pendant line 31 to the end of main boom 29 while foldable boom 34 is being folded. Pin connector 47, shown in greater detail in FIGURE 11, is used to connect two sections of the pendant line 31. In FIGURE 8, pin connector 47 is shown as being inserted in hole 48 at the end of boom 29. As force is applied to pendant line 31 the force is transmitted through pins 47, one on each side of boom 29, to control the movement of boom section 29. As there is no force applied on the outer section of pendant line 31 it hangs relatively loosely along the boom section 34.

Boom sections 29 and 34 are connected by hinge members 49 fastened together by hinge pin 50.

Boom section 29 is also provided at the top with projection 51 containing hole 52, and at the bottom with projection 53 containing hole 54. Boom section 34 is provided at the top with projection 55 containing hole 56 and at the bottom with projection 57 containing hole 58. Boom 34 is further provided with auxiliary holder 59 containing hole 60 and auxiliary holder 61 containing hole 62.

Figure 9:
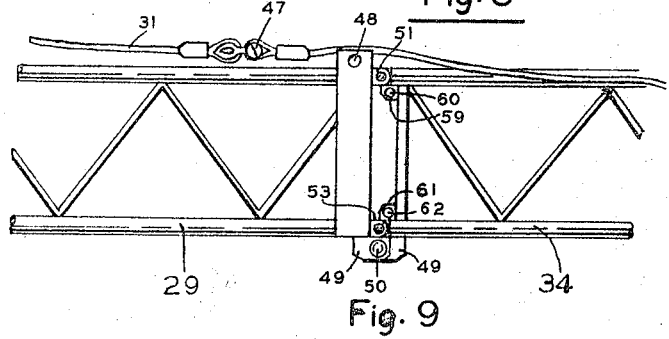
FIGURE 9 is an enlarged fragmentary elevational view of the hinged portion of the boom after it has been reassembled to operable position.

As shown in FIGURE 9, when the two boom sections are brought together, holes 52 and 56 are aligned and a suitable fastener is inserted therein; holes 54 and 58 are aligned and a suitable fastener is inserted therein. The operation is duplicated on the opposite side of the boom also, not visible in these figures.

Figure 15:
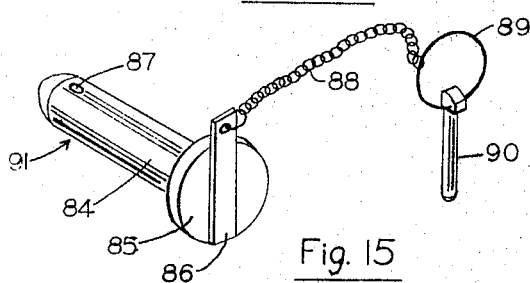
FIGURE 15 is a perspective view of a suggested fastening element for securing the two hinged portions of the boom together.

FIGURE 15 illustrates an example of the type of fastener which may be used. Fastener 91 is comprised of a cylindrical body portion 84 with a flattened head portion 85. Attached to head 85 is a strip 86 to which a chain member 88 is fastened. At the opposite end of chain 88 is ring 89 to which fastening key 90 is attached.

In operation, the pin is inserted into the holes provided therefor, for example holes 52 and 56, key 90 is brought around and inserted into hole 87 of body 84, then ring 89 is snapped down over the end of fastener 91 thus holding key 90 securely in place, which in turn holds fastener 91 in place.

In FIGURE 9 pin 47 has been removed from hole 48 and pendant line 31 is ready for use to support the outer end of boom 34.

FIGURE 11 shows in greater detail the pin 47 used for connecting two sections 63 and 64 of pendant line 31. As can be noted in this figure, section 63 is provided with a clevis 65 fastened to a loop in the end of 63 and section 64 is provided with a clevis 66 inserted in a loop in the end of 64.

The two clevises 65 and 66 are aligned and pin 47 is inserted therethrough.

Pin 47 has a relatively flat head portion 67, which may be grooved if desired as a guide to indicate the position of the pin-receiving hole 69 in the elongated portion 68, and a relatively long body portion which extends beyond the thickness of the clevises 65 and 66. This elongated portion 68 is used for insertion in holes 48 of boom section 29 and is of sufficient length to extend therein. Welding spots 80 hold the pin in position relative to the clevises 65 and 66.

Elongated portion 68 may be provided with a hole 69 through which a pin member may be inserted to prevent the accidental removal of the pin 47 from the hole 48. Any suitable pin member may be used.

Figure 13:
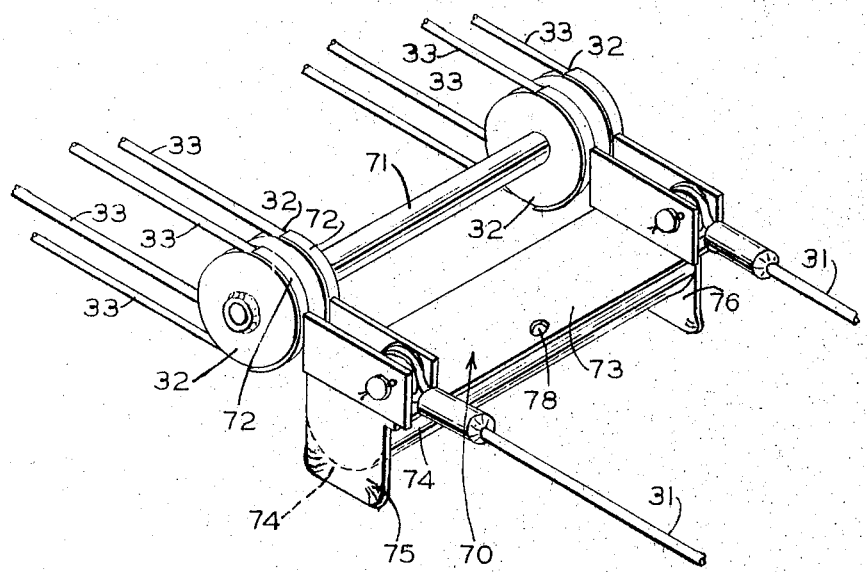
FIGURE 13 is a perspective view of the equalizer bar used for the prevention of fouling of the sheaves and lines during the folding and unfolding operation.
Figure 14:
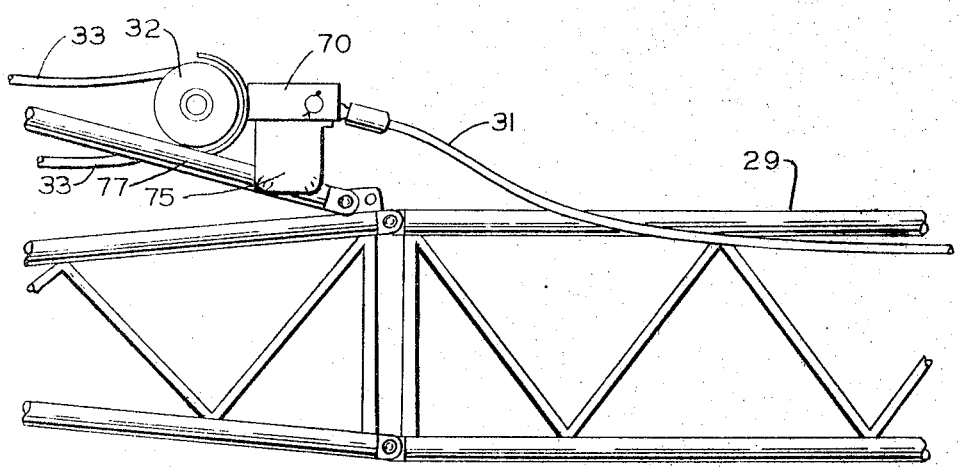
FIGURE 14 is a fragmentary elevational view showing the equalizer bar in its most forward position so as to permit transfer of the pivot point of the pendant lines from the end of the boom to the end of the shorter unfolded portion of the boom prior to the folding operation.

FIGURES 10, 13 and 14 show the details of the equalizer bar 40 used to prevent fouling of the sheaves 32 and lines 33. The sheaves 32, connected by axle 71 are provided with sheave protectors 72. Fastened to the axle 71 is equalizer 70 shown in FIGURE 13 as consisting of a relatively flat upper member 73 connected to a curved bottom member 72. At each end of flat member 73 are guides 75 and 76 which fit outside of boom stop 77 and hold the sheaves in position.

It will be noted that the bottom corners of guides 75 and 76 are rounded and curved outwardly so as to cover a larger area when being lowered. Due to this outward curvature the guides will contact the boom stop even if the sheaves 32 are askew when being lowered and will turn the sheaves and equalizer bar to their proper position.

Flat portion 73 of equalizer bar 70 is provided with a hole 78 for atttachment of any suitable device to slide the bar along the boom stops 77. Curved surface 74 permits easy movement of the bar along boom stop 77 even if the bar is tilted either upwardly or downwardly in its movement.

FIGURE 10 shows the equalizer bar 70 in the position it assumes when lines 33 are slackened and it is permitted to rest on boom stops 77. FIGURE 14 illustrates the equalizer bar in its forward position, moved forward to permit the pins 47 of pendant line 31 to be inserted in holes 48 of boom 29, explained in detail subsequently.

Operation of the device is as follows:

Let us assume the crane has been transported to the job site and is just arriving as shown in FIGURE 1. The wheeled support 35 is in a position above the roadway and the boom is being supported by pendant lines 31 attached to the end of boom section 29 as shown in FIGURE 8. The loose section of pendant line 31 is supported by brackets 37 located along the bottom of boom section 34. Once at the job location the boom is lowered to the position shown in FIGURE 2 with the end of boom 34 resting on the ground and the wheels 39 also resting on the ground.

Connector 79, which fastens boom 34 to boom 29 for travelling, is unfastened.

Then force is applied to pendant lines 31 and as they are shortened the end of booms 29 and 34 travel upwardly with the wheels 39 travelling along the ground to support the boom point 35 (FIGURE 3).

As the boom 29 continues upwardly boom 34 moves outwardly until it reaches the position shown in FIGURE 4. It is raised sufficiently so that wheels 39 are off the ground in the position shown in FIGURES 4 and 5.

In order to switch the axle of the carriage 41 pin 43 is removed and the carriage rotated about pivot 42 to the position shown in FIGURE 6. Pin 43 is inserted into hole 45 of carriage 41 and the wheel now has a different center of rotation with relation to the boom point.

Figure 7:
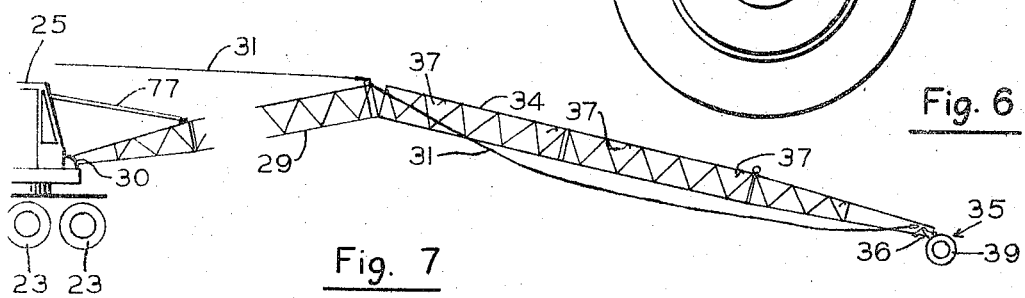
FIGURE 7 is an elevational view of the crane with the boom in an almost fully extended position.

Then boom 29 is lowered and in so doing wheels 39 lead boom 34 outwardly away from boom 29 in a manner shown in FIGURE 7.

As the crane assumes the position shown in FIGURE 7 the hinged portions approach each other as seen in FIGURE 8. As the boom 29 is lowered further the two sections align themselves horizontally.

Pins are removed from the auxiliary holders 59 and 61 and inserted into holes 52 and 54, at the same time passing through holes 56 and 58. With these pins connected we now have a solid one piece boom.

With the boom in this straight out position resting on the ground the lines 33 are run out far enough to permit equalizer bar 70 to rest on boom stop 77 at the approximate location shown in FIGURE 14.

This permits pendant lines 31 to be in a relatively loose condition and pins 47 are removed from holes 47 of boom 29.

It is optional at this point as to whether wheel carriage 41 and wheels 39 are removed or not. If it is desired that they be removed, pivot 42 and pin 43 are removed and the carriage is free. Due to the relatively small size and weight of the wheeled support 35 it may be left attached to the boom point 34 during use without interfering therewith.

As pins 47 are now removed from holes 48, any force applied to pendants 31 is now transferred to the boom at point 40, shown in FIGURES 5 and 6. The boom may then be lifted to the position shown in FIGURE 12 for operation.

Notice will be taken that in this FIGURE 12, hoisting cable 82 with hook member 83 on the end thereof are shown in position ready for operation. Although these members 82 and 83 have been eliminated from the other figures in the drawings so as to avoid confusion with the pendant lines 31, they are at all times connected to the boom and need not be removed for the folding, transporting, and unfolding operation.

After the job is completed and it is desired that the crane be moved to a different job site the procedure is as follows:

The boom is lowered from the position shown in FIGURE 12 until the end of the boom comes to rest on the ground in a relatively horizontal position. If the wheeled carriage has been left attached, then the boom is lowered until the wheels contact the ground. If the wheeled carriage has previously been removed then the boom is stopped before the boom end reaches the ground, the wheeled carriage 41 is rolled in and attached quickly by means of pivot pin 42 and fastener 43 through hole 45 into end 44 of boom 34.

With the wheels attached, the lines 33 are run out so that pendant line 31 is slack and the equalizer bar comes to rest on the boom stop 77 in approximately the location shown in FIGURE 10.

With the equalizer bar 70 in this location the connection between the two sections of pendant line 31 will be in the position shown in FIGURE 9.

As stated in our objects of invention one of our principal objects is to provide an arrangement whereby the pendant lines do not have to be disconnected and disassembled each time the boom is folded. If one were to leave the pendant lines intact and tried to fold the outer section down, the tension on the pendant lines, due to the increased length of travel of the lines over the ends of the booms 29 and 34 would cause the pendant lines to break.

To solve the problem we have increased the length of the outer section of the pendant lines 31 a distance equal to the distance between the center of the hole 48 in the boom 29 and the center of the hinge pin 50. At the end of this added length of pendant line is the exact position we have located the pin 47.

To state it in other words, when the pendant line is fastened to the end of boom 34 and is drawn tight, the pin 47 will be to the rear of hole 48 in boom 29 a distance equal to the distance between the center of the hole 48 and the center of the hinge pin 50.

Thus when pin 47 is in hole 48 the outer section of pendant lines 31 has been lengthened a sufficient amount to permit the pendant line to travel in an arc, with the boom 34, around pivot point 50.

Due to this increased length of pendant lines 31 the pin 47 will be in the approximate location as shown in FIGURE 9 when lines 33 are loosened enough to permit equalizer bar 70 to rest on boom stop 77 as shown in FIGURE 10.

Obviously, pins 47 will have to be moved forward to holes 48 but equalizer bar 70 will also have to be moved forwardly.

Any suitable device may be attached to hole 78 (FIGURE 13) of equalizer bar 70 and due to the curvature of the bottom member 74 it may easily be slid along the boom stop 77 from the position shown in FIGURE 10 to the approximate position shown in FIGURE 14. A suggested means of moving the equalizer bar forward is to connect a come-along device to the boom 29 by means of a suitable loop provided therein and fastening the other end of the come-along to the hole 78 of equalizer bar 70.

It is within the purview of this specification to provide the curved bottom 74 of the equalizer with rollers so as to facilitate the movement along the boom stops 70.

With the equalizer bar moved forwardly to the position shown in FIGURE 14, pins 47 may be easily inserted into holes 48 on each side of the outer end of boom section 29, leaving the pendant lines 31 intact for their entire length.

The pins are removed from holes 52 and 54, 56 and 58, and placed in auxiliary holders 60 and 62.

By lifting the boom 29, section 34 assumes the position shown in FIGURES 7 and 8 and as boom 29 is lifted further, boom 34 rides on wheels 39 until the section 34 assumes a vertical position, slightly raised from the ground.

While in this position (FIGURE 6) pin 43 is removed, the carriage 41 and wheels 39 are rotated to the position shown in FIGURE 5 and pin 43 is inserted into hole 46 of carriage 41.

Now the crane is in the position shown in FIGURE 4 and as it is lowered wheels 39 cause it to assume the position shown in FIGURE 3 and finally the position shown in FIGURE 2 with the inner end of the boom 34 resting on the ground.

As the two boom sections assume this position, guides 81 extending downwardly from each side of section 29 guide section 34 into vertically aligned relationship with section 29.

Connector 49 is then engaged and fastens the two boom sections securely together. The entire boom section is raised slightly to the position shown in FIGURE 1 and the crane is ready for travel to a new location.

In this specification and the accompanying drawing there is shown and described a preferred embodiment of our invention; it is to be understood that this is not intended to be exhaustive nor limiting of the invention, but on the contrary, is given for purposes of illustration in order that others skilled in the art may fully understand the invention and the principles thereof and the manner of applying it in practical use so that they may modify and adapt it in various forms, each as may be best suited to the conditions of a particular use, and still fall within the purview of this application.

Therefore the invention is not limited by that which is shown in the drawing and described in the specification but only as indicated in the appending claims.

What is claimed is:
1. In a crane,
   (a) a folding boom construction comprising a plurality of adjoining sections,
   (b) at least two of said adjoining sections being hingedly connected together,
   (c) a wheeled carriage connected to the outermost section of said boom,
   (d) means carried on the pendant lines for fastening said pendant lines to the boom in the vicinity of the hinge connecting the two sections without disconnecting said pendant lines from the boom,
   (e) said wheeled carriage having a main axle pivotally attached to the end of said boom,
   (f) said wheeled carriage having a plurality of auxiliary axles for changing the center of gravity of said wheeled carriage while the carriage is attached to the end of said boom.

2. A crane construction as set forth in claim 1 in which the means for fastening said pendant lines to the boom near the folding point consists of an elongated pin inserted between two sections of each pendant line with said pin extending outwardly from said lines a distance great enough to fasten said lines to said boom without removing said pin from said lines.

3. In a crane,
   (a) a folding boom construction comprising a plurality of adjoining sections,
   (b) at least two of said adjoining sections being hingedly connected together,
   (c) a wheeled carriage connected to the outermost section of said boom,
   (d) means carried on the pendant lines for fastening said pendant lines to the boom in the vicinity of the hinge connecting the two sections without disconnecting said pendant lines from the boom,
   (e) said pendant lines being removably fastened to the boom near their center with the outer ends of said lines being fixed to the outermost end of the folding section of said boom near said wheeled carriage,
   (f) said pendant lines being connected at their opposite ends to an equalizer and guide bar,
   (g) said equalizer and guide bar being movable relative to said boom and holding movable sheaves in a horizontal position relative to the boom supports during the operation of folding and unfolding the adjoining sections of the boom.

4. A crane construction as claimed in claim 3 in which the equalizer bar consists of a flat upper portion and a rounded bottom portion with guides extending downwardly from each end thereof.

5. A crane construction as set forth in claim 3 in which the wheeled carriage (c) is detachably connected to the boom point.

6. An equalizer bar for positioning the sheaves of a crane relative to the boom stop of a crane comprising
   (a) an elongated member parallel to the axle of the sheaves and fastened to said sheaves,
   (b) a rounded bottom portion on said elongated member,
   (c) vertical guide members on each end of said elongated member,
   (d) said rounded bottom portion slidably positioned on the boom stop,
   (e) said vertical guide members extending downwardly over the outer edges of the boom stop,
   (f) pendant lines fastened to said equalizer bar at the side opposite the sheaves.

References Cited by the Examiner

UNITED STATES PATENTS

| | | | |
|---|---|---|---|
| 3,072,265 | 1/1963 | Nickles | 212—59 |
| 3,104,764 | 9/1963 | Templeton | 212—144 X |
| 3,176,854 | 4/1965 | Brown | 212—144 |

FOREIGN PATENTS

| | | |
|---|---|---|
| 815,833 | 7/1949 | Germany. |
| 981,129 | 1/1965 | Great Britain. |

ANDRES H. NIELSEN, *Primary Examiner.*

HUGO O. SCHULZ, *Examiner.*

A. L. LEVINE, *Assistant Examiner.*